(12) United States Patent
Greenberg et al.

(10) Patent No.: US 9,909,607 B2
(45) Date of Patent: Mar. 6, 2018

(54) HIGH TEMPERATURE THREAD LOCKING COMPOUND

(71) Applicant: United Technologies Corporation, Hartford, CT (US)

(72) Inventors: Michael D. Greenberg, Bloomfield, CT (US); Mark B. Gossner, Durham, CT (US); James R. Kennedy, Orange, CT (US); Nathan A. Shirk, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 471 days.

(21) Appl. No.: 14/714,995

(22) Filed: May 18, 2015

(65) Prior Publication Data
US 2015/0260215 A1    Sep. 17, 2015

Related U.S. Application Data

(62) Division of application No. 12/425,785, filed on Apr. 17, 2009, now Pat. No. 9,033,631.

(51) Int. Cl.
*A41H 37/00*    (2006.01)
*A44B 19/00*    (2006.01)
(Continued)

(52) U.S. Cl.
CPC ........... *F16B 39/01* (2013.01); *F16B 33/002* (2013.01); *F16B 39/00* (2013.01); *F16B 39/02* (2013.01);
(Continued)

(58) Field of Classification Search
CPC ...... F16B 39/01; F16B 39/225; F16B 33/002; F16B 33/004; C09J 11/04;
(Continued)

(56) References Cited

U.S. PATENT DOCUMENTS 3,129,069 A    4/1964 Hanink et al.
3,814,156 A *  6/1974 Bachmann ............. F16B 33/06
                                                411/258
(Continued)

FOREIGN PATENT DOCUMENTS

EP    0580546 A2    1/1994

OTHER PUBLICATIONS

Coatings for Industry, Inc., (Alseal 5000) from http://tm-consultants.com/ds/E-Alseal_5000.pdf, visited Jan. 28, 2009.

*Primary Examiner* — Philip Tucker
*Assistant Examiner* — Brian R Slawski
(74) *Attorney, Agent, or Firm* — Kinney & Lange, P.A.

(57) ABSTRACT

According to the present disclosure, a method for securing a threaded fastener in a threaded hole includes directly applying a locking compound to at least a portion of threads to be mated on either the threaded fastener or the threaded hole. The locking compound includes a substantially pure, non-chromated aluminum pigmented compound suspended in a water-based inorganic binder with temperature resistance in excess of 900 degrees Fahrenheit (about 482 degrees Celsius). The threaded fastener is threaded into the threaded hole after applying the locking compound on the threads to be mated.

13 Claims, 4 Drawing Sheets

(51) Int. Cl.
| | |
|---|---|
| *B32B 7/08* | (2006.01) |
| *B29C 65/00* | (2006.01) |
| *B32B 37/00* | (2006.01) |
| *B32B 38/10* | (2006.01) |
| *C04B 37/00* | (2006.01) |
| *F16B 39/00* | (2006.01) |
| *F16B 39/01* | (2006.01) |
| *F16B 39/02* | (2006.01) |
| *F16B 33/00* | (2006.01) |
| *B32B 37/12* | (2006.01) |
| *B29C 65/72* | (2006.01) |
| *B29C 65/48* | (2006.01) |

(52) U.S. Cl.
CPC .......... *B29C 65/4835* (2013.01); *B29C 65/72* (2013.01); *B32B 2037/1246* (2013.01); *B32B 2037/1276* (2013.01); *Y10S 411/93* (2013.01)

(58) Field of Classification Search
CPC .... B32B 2037/1253; B32B 2037/1246; B32B 2037/1276; B29C 65/48; B29C 65/4835; B29C 65/72
USPC ....... 156/60, 66, 91, 92, 247, 278, 293, 294, 156/295, 297, 298, 325; 411/258; 148/537; 523/176
See application file for complete search history.

(56) References Cited

U.S. PATENT DOCUMENTS

| | | |
|---|---|---|
| 4,887,949 A | 12/1989 | Dimmick, III et al. |
| 5,122,020 A | 6/1992 | Bedi |
| 5,356,254 A | 10/1994 | DiMaio et al. |
| 5,635,546 A | 6/1997 | Rich et al. |
| 5,853,520 A | 12/1998 | Rich et al. |
| 6,322,306 B1 | 11/2001 | Dutton |
| 6,953,509 B2 | 10/2005 | Keener |

* cited by examiner

HIGH TEMPERATURE THREAD LOCKING COMPOUND

BACKGROUND

This disclosure relates to locking threaded fasteners, and in particular, to compounds for locking threaded fasteners.

Certain compounds are routinely applied between threaded fasteners, such as bolts, and threaded holes, such as nuts, to lock the bolt into the threaded hole. These locking compounds provide torque resistance against bolt removal. Such locking compounds are typically designed to withstand only relatively low temperatures, breaking down and providing less torque resistance when exposed to higher temperatures, such as temperatures in excess of 450 degrees Fahrenheit. Bolts and threaded holes for certain applications, such as in gas turbine engines, can be exposed to temperatures exceeding 500 degrees Fahrenheit and higher. Consequently, bolts exposed to such high temperatures are typically locked in place with some type of mechanical bolt lock as opposed to applying a locking compound between threads.

Some compounds, such as gas turbine engine paint, are designed to withstand higher temperatures. Such paints are typically applied on engine surfaces, over bolts and nuts after assembly, to protect such surfaces from corrosion. These paints are not applied in threaded holes and have little or no wicking between bolts and threaded holes.

SUMMARY

According to the present disclosure, a method for securing a threaded fastener in a threaded hole includes directly applying a locking compound to a portion of threads to be mated on either the threaded fastener or the threaded hole. The locking compound includes a substantially pure, non-chromated aluminum pigmented compound suspended in a water-based inorganic binder with temperature resistance in excess of 900 degrees Fahrenheit (about 482 degrees Celsius), and wherein the locking compound is between at least 5% of the portion of the fastener threads that are to be mated with the corresponding portion of the hole threads. The threaded fastener is threaded into the threaded hole after applying the locking compound on the threads such that presence of the locking compound between the mated fastener threads and the hole threads causes an increase in running torque by at least about 60 inch-pounds after the assembly has been heated to a temperature exceeding about 900 degrees Fahrenheit (about 482 degrees Celsius).

DETAILED DESCRIPTION

In general, the present disclosure is an assembly including, and a method of securing, a bolt in a threaded bolt hole using a heat resistant locking compound. The locking compound includes an aluminum pigmented compound suspended in a water-based inorganic binder. The locking compound may be applied on threads of the bolt hole, the bolt is threaded into the bolt hole tightly, and the locking compound is cured. Compared to prior art assemblies, the exemplary assembly embodiment provides a surprisingly strong bolt lock that is resistant to high temperatures such as those in a gas turbine engine.

Figure 1:
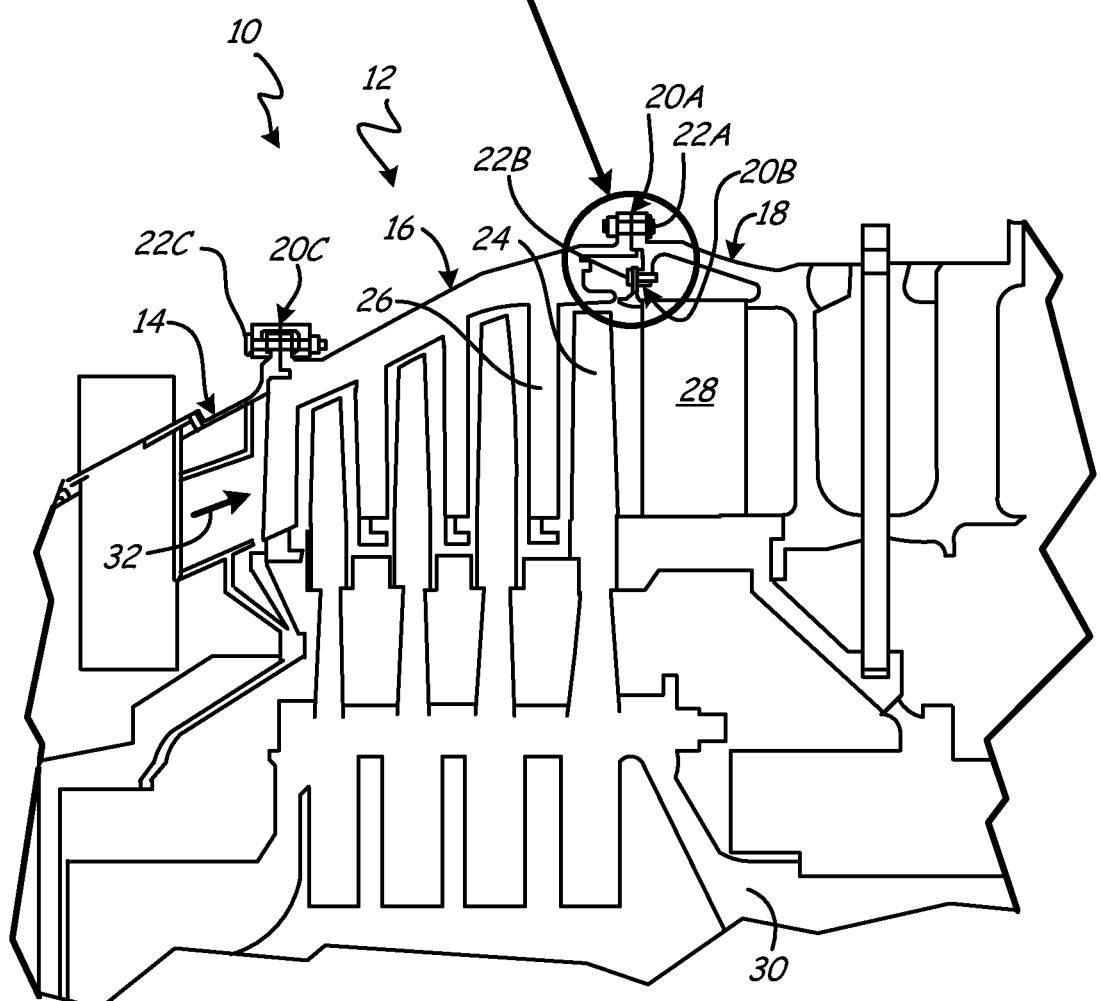
FIG. 1 is a partial side sectional view of a power turbine section of a gas turbine engine.

FIG. 1 is a partial side sectional view of gas turbine engine 10 showing a portion of power turbine section 12. Power turbine section 12 includes turbine inlet case 14, turbine main case 16, turbine outlet case 18, flanged connections 20A-20C, bolts 22A-22C, turbine blades 24 and 26, guide vane 28, shaft 30, and flow path 32. Turbine inlet case 14 is connected to turbine main case 16 at flanged connection 20C and secured by bolt 22C. Turbine main case 16 is connected to turbine outlet case 18 at flanged connection 20A and secured by bolt 22A. Guide vane 28 is connected to turbine outlet case 18 at flanged connection 20B and secured by bolt 22B. Turbine blades 24 extend from shaft 30 into flow path 32, and turbine blades 26 extend from turbine main case 16 into flow path 32. Flow path 32 is defined by turbine inlet case 14, turbine main case 16, and turbine outlet case 18.

Operation of gas turbine engine 10 is well known in the art and will, therefore, not be fully illustrated nor described in detail except as necessary to understand the invention. Hot gas from a combustor (not shown) passes through low and high pressure turbines (not shown) and then through turbine inlet case 14, turbine main case 16, and turbine outlet case 18 of power turbine section 12. This hot gas heats all of power turbine section 12 including flanged connections 20A-20C and bolts 22A-22C. Temperatures in power turbine section 12 can reach 900 to 1100 degrees Fahrenheit (about 482 to 593 degrees Celsius), and temperatures at flanged connections 20A-20C can reach similar values. Such high temperatures can cause metals to expand, often at different rates, and later contract when the metals cool. Repeated expansion and contraction at flanged connections 20A-20C can cause bolts 22A-22C to loosen. Such high temperatures can also damage and change properties of many materials. Thus, at least some known prior art locking compounds can fail to adequately lock bolts 22A-22C tightly. Some mechanical locks can also fail to adequately lock bolts 22A-22C tightly.

Figure 2A:
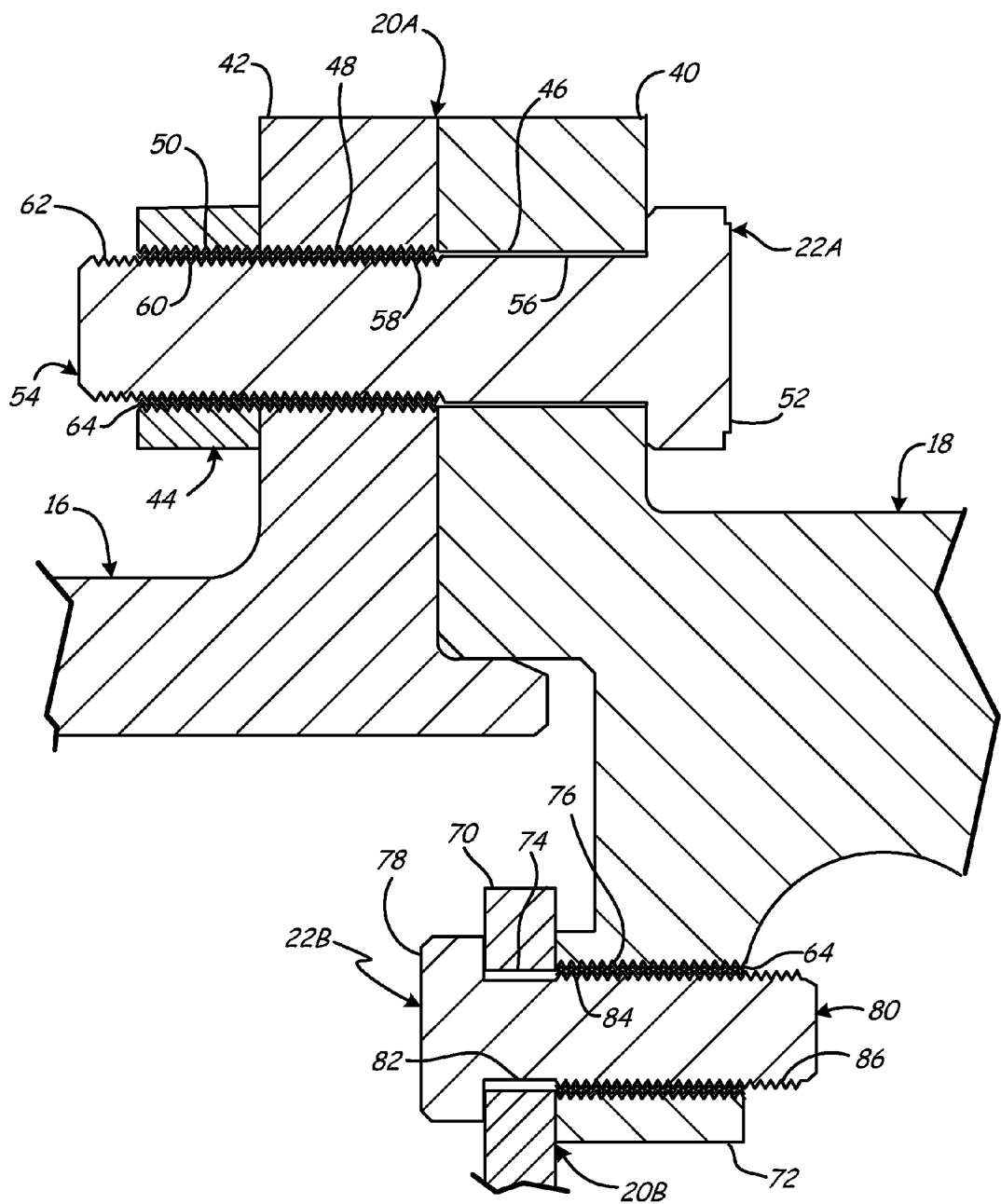
FIG. 2A is an enlarged side sectional view, taken from FIG. 1, of flanged connections with bolts.

FIG. 2A is an enlarged side sectional view, taken from FIG. 1, of flanged connections 20A and 20B with bolts 22A and 22B. Flanged connection 20A further includes flanges 40 and 42, nut 44, non-threaded bolt hole 46, and threaded bolt holes 48 and 50. Bolt 22A includes bolt head 52 and bolt shaft 54 (having non-threaded portion 56 and threaded portions 58, 60, and 62).

Flange 40 is adjacent to and extends from turbine outlet case 18. Flange 42 is adjacent to and extends from turbine main case 16. Flange 40 is positioned adjacent to flange 42 such that non-threaded bolt hole 46 is axially aligned with threaded bolt hole 48. Bolt shaft 54 is positioned inside non-threaded bolt hole 46 and threaded bolt hole 48 such that non-threaded portion 56 is adjacent to non-threaded bolt hole 46 and threaded portion 58 is adjacent to and mated with threaded bolt hole 48. Nut 44 is threaded on bolt shaft 54 such that threaded portion 60 is adjacent to and mated with threaded bolt hole 50. Because bolt 22A is threaded into threaded bolt hole 48 of flange 42 and also into threaded bolt hole 50 of nut 44, nut 44 can function as a jam nut. Threaded portion 62 is not mated with any corresponding threads. Locking compound 64 is positioned between threaded portion 58 and threaded bolt hole 48 as well as between threaded portion 60 and threaded bolt hole 50.

In one embodiment, locking compound 64 can be between at least 5% of mated threads between threaded portion 58 and threaded bolt hole 48 (and/or between at least 5% of mated threads between threaded portion 60 and threaded bolt hole 50) in order to increase torque required to rotate bolt 22A. In another embodiment, locking compound 64 can be between at least 40% of mated threads to further increase torque required to rotate bolt 22A. In the illustrated embodiment, locking compound 64 is between about 100% of the mated threads to further increase torque required to rotate bolt 22A. In the illustrated embodiment, locking compound 64 is not applied between non-threaded portion 56 and non-threaded bolt hole 46 nor to threaded portion 62. In an alternative embodiment, locking compound 64 can also be applied to one or all of these surfaces. For example, a user can intentionally apply locking compound 64 directly to non-threaded portion 56, non-threaded bolt hole 46, or threaded portion 62. Alternatively, a user can apply locking compound 64 directly to threaded bolt hole 50, which will transfer a portion of locking compound 64 to threaded portion 62 as bolt 22A is threaded into and through threaded bolt hole 50.

Flanged connection 20B further includes flanges 70 and 72, non-threaded bolt hole 74, and threaded bolt hole 76. Bolt 22B includes bolt head 78 and bolt shaft 80 (having non-threaded portion 82 and threaded portions 84 and 86).

Flange 70 is adjacent to and extends from guide vane 28 (shown in FIG. 1). Flange 72 is adjacent to and extends from turbine outlet case 18. Flange 70 is positioned adjacent to flange 72 such that non-threaded bolt hole 74 is axially aligned with threaded bolt holes 76. Bolt shaft 80 is positioned inside non-threaded bolt hole 74 and threaded bolt hole 76 such that non-threaded portion 82 is adjacent to non-threaded bolt hole 74 and threaded portion 84 is adjacent to and mated with threaded bolt hole 76. Threaded portion 86 is not mated with any corresponding threads. Locking compound 64 is positioned between threaded portion 84 and threaded bolt hole 76. Locking compound 64 can be between threaded portion 84 and threaded bolt hole 76 covering 5%, 40%, or 100% of the mated threads, such as described above with reference to bolt 22A. Locking compound 64 can also be transferred to threaded portion 86 as bolt 22B is threaded into and through threaded bolt hole 76. Moreover, locking compound 64 can be used with virtually any suitable combination of threaded bolts and threaded bolt holes, such as threaded through holes, threaded blind holes, and threaded nuts.

Locking compound 64 can include an aluminum pigmented compound suspended in a water-based inorganic binder. In one embodiment, pigment in locking compound 64 can consist essentially of pure aluminum with substantially no other filler or adulterant. Prior to applying and curing locking compound 64, it can be a paint composed of between 52% and 57% solids by weight. One suitable paint for use as locking compound 64 is SermeTel W, manufactured by Sermatech International of Pottstown, Pa. SermeTel W is chromated, and can be useful for applications where hexavalent chromium is not a concern. In an alternative embodiment, a non-chromated aluminum pigmented compound suspended in a water-based inorganic binder can be used for applications benefiting from less chromium exposure. In yet another embodiment, locking compound 64 can be alkaline to help inhibit corrosion. Corrosion can permanently lock threaded bolts into threaded bolt holes. Thus, locking compound 64 can provide strong resistance to torque during high temperature operation while also facilitating intentional bolt removal during maintenance disassembly by inhibiting corrosion. A suitable non-chromated, alkaline paint for use as locking compound 64 is Alseal 5000, manufactured by Coatings for Industry, Inc. of Souderton, Pa. Alseal 5000 is a substantially pure aluminum pigmented compound suspended in an alkaline, water-based inorganic binder system.

In the illustrated embodiment, bolts 22A and 22B are made of stainless steel, and flanges 40, 42, 70, and 72 are made of Inconel 718 (a precipitation hardenable nickel-based alloy). In alternative embodiments, bolts 22A and 22B and flanges 40, 42, 70, and 72 can be made of virtually any suitable high temperature metal, such as steel, titanium, nickel, cobalt, or alloys thereof.

Figure 2B:
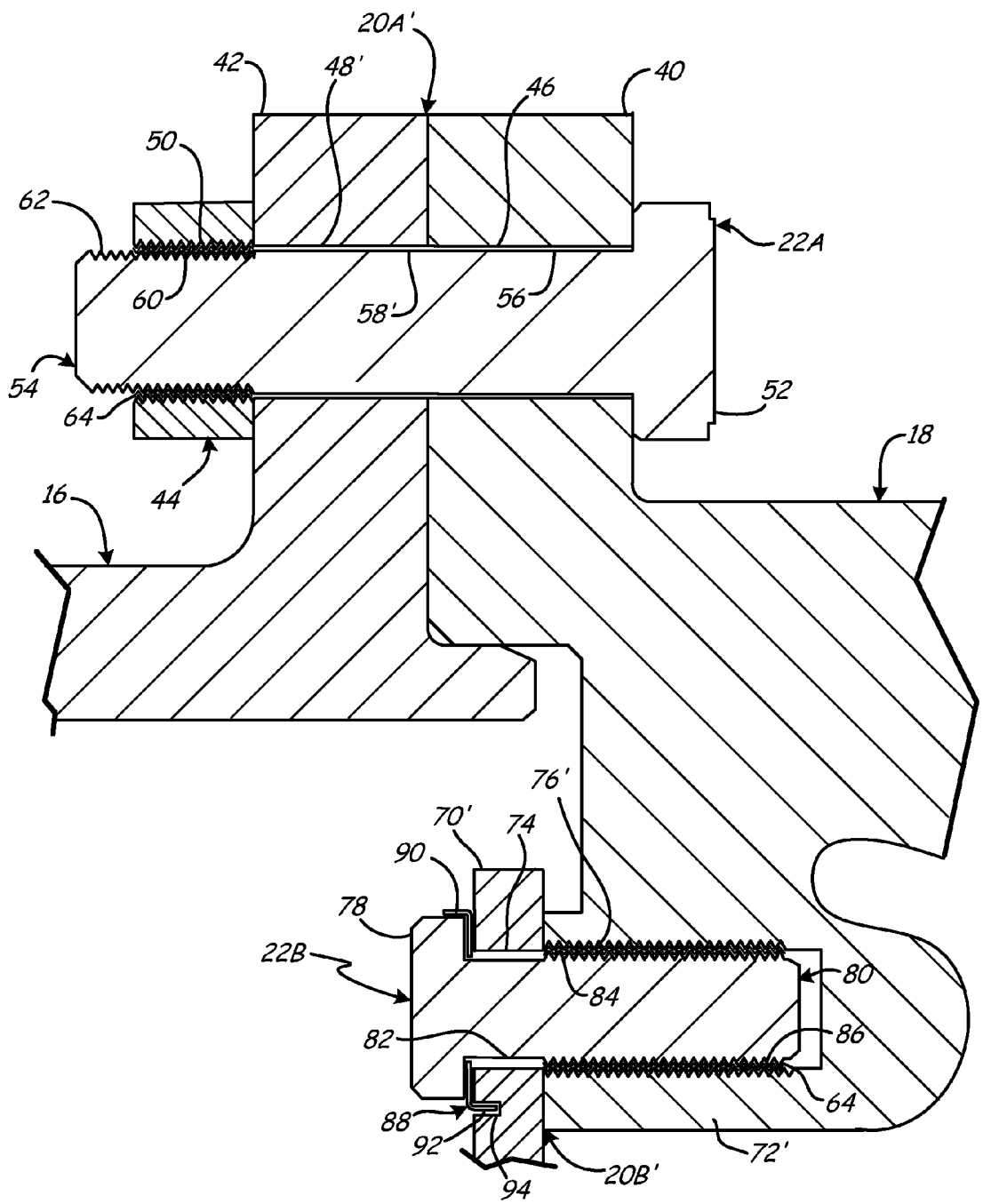
FIG. 2B is an alternative embodiment of the flanged connections with bolts of FIG. 2A.

FIG. 2B is an alternative embodiment of flanged connections 20A' and 20B' with bolts 22A and 22B. Flanged connection 20A' is similar to flanged connection 20A of FIG. 2A except that non-threaded bolt hole 48' and non-threaded portion 58' have no threads. Bolt 22A is only threaded into threaded bolt hole 50. Locking compound 64 is between threaded bolt hole 50 and threaded portion 60.

Flanged connection 20B' is similar to flanged connection 20B of FIG. 2A except for two differences. First, threaded bolt hole 76' is a blind hole in flange 72' that is closed at the end, as opposed to a through hole such as threaded bolt hole 76 as in FIG. 2A. There is a pocket of air between a tip of bolt shaft 80 and the end of threaded bolt hole 76'. So long as excess locking compound 64 does not create a hydraulic lock by filling the pocket, the pocket can help facilitate installation of bolt 22B. The amount of locking compound 64 pushed into the pocket of air can be reduced by applying locking compound 64 to threaded portion 86 of bolt 22B instead of to threaded bolt hole 76'. Second, mechanical lock 88 provides further torque resistance in addition to that of locking compound 64. Mechanical lock 88 is positioned between bolt head 78 and flange 70'. Mechanical lock 88 has tab 90 folded against bolt head 78 and tab 92 folded into tab hole 94 of flange 70'. When a torque is applied to rotate bolt 22B, tabs 90 and 92 are pressed against bolt head 78 and tab hole 94, respectively, to resist rotation. In alternative embodiments, virtually any suitable lock nut, lock washer, or other mechanical lock can be used in combination with locking compound 64.

In alternative embodiments, bolts 22A, 22B, and 22C can be a threaded fastener having a shape different from those illustrated in FIGS. 1, 2A, and 2B. For example, bolts 22A, 22B, and 22C can be Allen or socket screws, machine screws, set screws, carriage bolts, or other screws and bolts. Additionally, bolts 22A, 22B, and 22C need not be traditional bolts at all. Locking compound 64 can be applied between virtually any suitable threaded fastener and a corresponding threaded hole.

Figure 3:
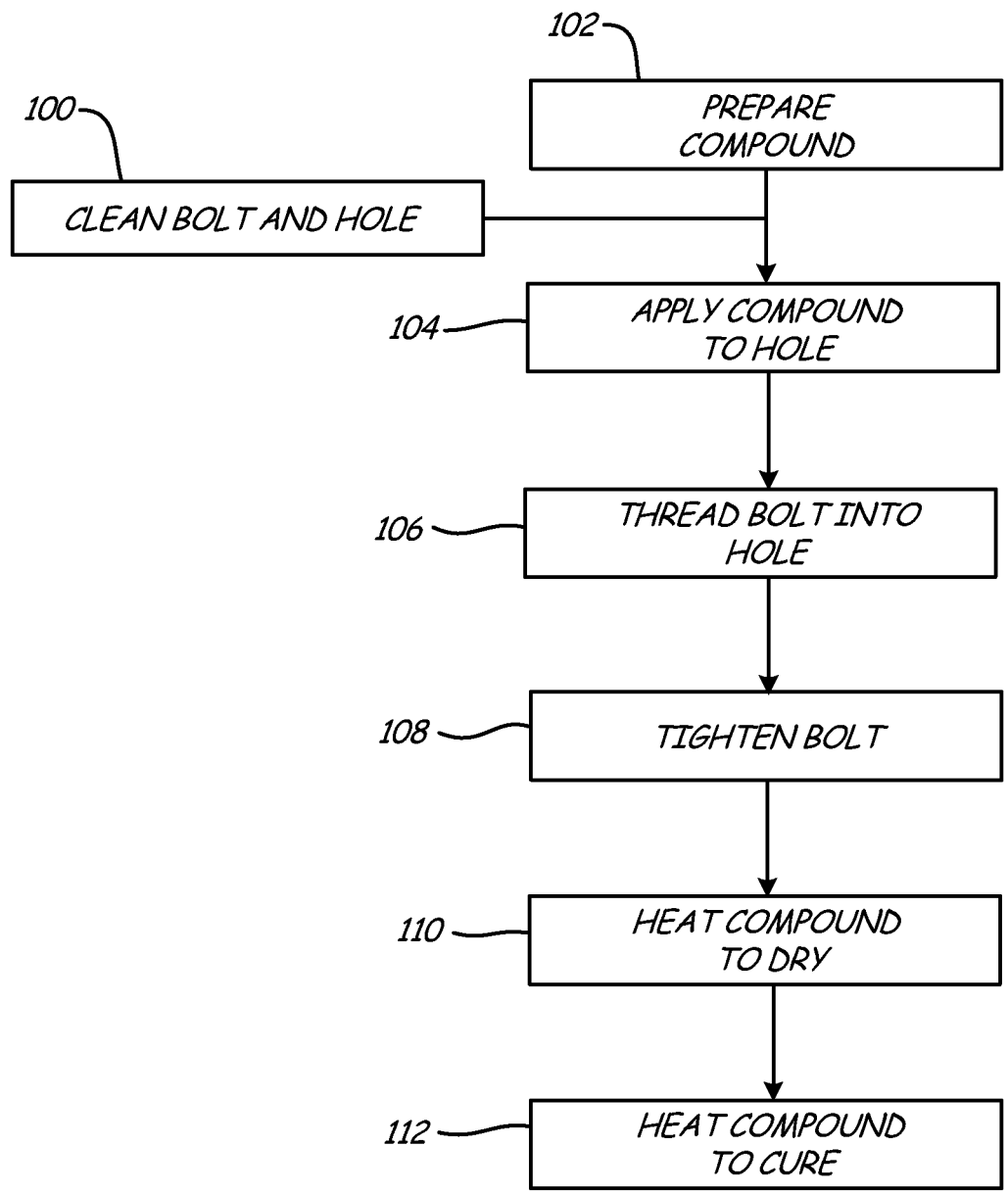
FIG. 3 is a flow chart of an exemplary method of securing a threaded fastener in a threaded hole.

FIG. 3 is a flow chart of a method of securing a threaded fastener in a threaded hole. For clarity, the method will be described with reference to flanged connection 20B and bolt 22B as illustrated in FIG. 2A. The method can, however, be used with other suitable threaded fasteners such as bolts 22A and 22C. Upon starting the method, threaded bolt hole 76 and threaded portions 84 and 86 of bolt 22B are cleaned (step 100). Cleaning can include suitable techniques such as degreasing, heating, and grit blasting. Oil, grease, organic deposits, rust, mill scale, old coatings, and other substances that can interfere with locking compound 64 should be substantially removed. Prior to, at the same time as, or shortly after step 100, locking compound 64 is prepared (step 102). When applying locking compound 64, the aluminum pigmented compound should be substantially dispersed in the water-based inorganic binder. Then locking compound 64 is applied to threaded bolt hole 76 (step 104). Locking compound 64 is affixed to about 100% of threads in threaded bolt hole 76. Within one minute after step 104, bolt 22B is inserted through non-threaded bolt hole 74 and threaded into threaded bolt hole 76 (step 106). Then bolt 22B is tightened such that bolt head 78 is tightly flush against flange 70 and that flange 70 is tightly flush against flange 72 (step 108). In one embodiment, bolt 22B can be tightened with an applied torque of about 350 inch-pounds (in-lb) or about 39.5 Newton-meters (Nm). In other embodiments, bolt 22B can be tightened with a different applied torque depending on bolt size, material, and thread type for a particular application.

After bolt 22B is tightened, then bolt 22B, flanged connection 20B, and locking compound 64 are dried (step 110). Drying can be done by heating to about 175 degrees Fahrenheit (about 79 degrees Celsius) for about 15 minutes or more. After drying, locking compound 64 is cured (step 112). Curing can be done by heating to about 650 degrees Fahrenheit (about 343 degrees Celsius) for about 30 minutes or more, followed by a post-cured heating of about 1000 degrees Fahrenheit (about 538 degrees Celsius) for about 90 minutes or more. In an alternative embodiment, the drying step (step 110) and the curing step (step 112) can be combined into a single heating operation. In yet another embodiment, the drying step (step 110) and/or the curing step (step 112) need not occur at the time of assembly. For example, when locking compound 64 is applied to threaded bolt hole 76 in gas turbine engine 10, drying and curing can occur when gas turbine engine 10 is operated for the first time, reaching temperatures between 900 degrees Fahrenheit and 1100 degrees Fahrenheit. At the conclusion of step 112, bolt 22B is in friction contact with cured locking compound 64 to provide substantial torque resistance, even after exposure to temperatures in excess of about 900 degrees Fahrenheit (about 482 degrees Celsius).

Example

A test block made of Inconel 718 material with eleven 0.3125×24 threaded bolt holes was provided. Eleven substantially similar exit guide vane bolts were then threaded into the eleven bolt holes. All bolts and holes were cleaned. Bolts 1 and 2 were threaded into bolt holes 1 and 2, respectively with no coating therebetween.

Approximately an entire threaded surface of each of bolts 3-6 was coated with military performance specification 23699 oil (MIL-PRF-23699). Bolts 3-6 were then threaded into bolt holes 3-6, respectively. Approximately an entire threaded surface of each of bolt holes 7-11 was painted with a non-chromated pure aluminum pigmented compound suspended in an alkaline, water-based inorganic binder (Alseal 5000). Bolts 7-11 were then threaded into bolt holes 7-11, respectively, within one minute of painting the bolt holes.

Bolts 2, 5, and 6 were tightened with a washer between bolt heads and the test block and with an applied torque of about 285 in-lb (about 32.2 Nm). Bolts 9, 10, and 11 were tightened with a washer between bolt heads and the test block and with an applied torque of about 350 in-lb (about 39.5 Nm). Bolts 1, 3, 4, 7, and 8 were not tightened and, instead, were left with a gap between each bolt head and the test block.

The test block, including installed bolts, was then subjected to a series of heating and cooling cycles. The temperature and duration of the cycles were selected to simulate an environment for one application of a bolt in a gas turbine engine. The test block was heated in an oven to about 900 degrees Fahrenheit (about 482 degrees Celsius) for at least 4 hours. The test block was cooled, then heated again to about 900 degrees Fahrenheit (about 482 degrees Celsius) for at least 4 hours, and then cooled again. Each bolt was then loosened by one full turn. Torque required to loosen each bolt was recorded. The test block was heated again to about 900 degrees Fahrenheit (about 482 degrees Celsius) for at least 4 hours and then cooled again. Each bolt was loosened a second time by one full turn and torque required to loosen each bolt was recorded again. The test block was heated again to about 900 degrees Fahrenheit (about 482 degrees Celsius) for at least 4 hours and then cooled again. Each bolt was loosened a third time by one full turn and torque required to loosen each bolt was recorded again. Measured torque results are as follows:

TABLE 1

(Bolts Not Tightened)

| Bolt | Coating | Breakaway Torque (First Turn) |
|---|---|---|
| 1 | None | 0 in-lb (0 Nm) |
| 3 | Oil | 1 in-lb (0.1 Nm) |
| 4 | Oil | 0 in-lb (0 Nm) |
| 7 | Alseal 5000 | 30 in-lb (3.4 Nm) |
| 8 | Alseal 5000 | 160 in-lb (18.1 Nm) |

TABLE 2

(Bolts Not Tightened)

| Bolt | Coating | Min. Running Torque (First Turn) |
|---|---|---|
| 1 | None | 0 in-lb (0 Nm) |
| 3 | Oil | 1-3 in-lb (0.1-0.3 Nm) |
| 4 | Oil | 0 in-lb (0 Nm) |
| 7 | Alseal 5000 | 14-20 in-lb (1.6-2.3 Nm) |
| 8 | Alseal 5000 | 100-200 in-lb (11.3-22.6 Nm) |

TABLE 3

(Bolts Not Tightened)

| Bolt | Coating | Min. Running Torque (Third Turn) |
|---|---|---|
| 1 | None | 0 in-lb (0 Nm) |
| 3 | Oil | 1 in-lb (0.1 Nm) |
| 4 | Oil | 0 in-lb (0 Nm) |
| 7 | Alseal 5000 | 7 in-lb (0.8 Nm) |
| 8 | Alseal 5000 | 80-141 in-lb (9.0-15.9 Nm) |

TABLE 4

(Bolts Tightened)

| Bolt | Coating | Breakaway Torque (First Turn) |
|---|---|---|
| 2 | None | 553 in-lb (62.5 Nm) |
| 5 | Oil | 590 in-lb (66.7 Nm) |
| 6 | Oil | 490 in-lb (55.4 Nm) |
| 9 | Alseal 5000 | 610 in-lb (68.9 Nm) |
| 10 | Alseal 5000 | 690 in-lb (78.0 Nm) |
| 11 | Alseal 5000 | 540 in-lb (61.0 Nm) |

TABLE 5

(Bolts Tightened)

| Bolt | Coating | Min. Running Torque (First Turn) |
|---|---|---|
| 2 | None | 0 in-lb (0 Nm) |
| 5 | Oil | 0 in-lb (0 Nm) |
| 6 | Oil | 11 in-lb (1.2 Nm) |
| 9 | Alseal 5000 | 80-120 in-lb (9.0-13.6 Nm) |
| 10 | Alseal 5000 | 100-370 in-lb (11.3-41.8 Nm) |
| 11 | Alseal 5000 | 60-120 in-lb (6.8-13.6 Nm) |

TABLE 6

(Bolts Tightened)

| Bolt | Coating | Min. Running Torque (Third Turn) |
|---|---|---|
| 2 | None | 0 in-lb (0 Nm) |
| 5 | Oil | 0 in-lb (0 Nm) |
| 6 | Oil | 11 in-lb (1.2 Nm) |
| 9 | Alseal 5000 | 90 in-lb (10.2 Nm) |
| 10 | Alseal 5000 | 200-230 in-lb (22.6-26.0 Nm) |
| 11 | Alseal 5000 | 110-135 in-lb (12.4-15.2 Nm) |

This example shows an unexpected result of Alseal 5000 being an effective locking compound. What was particularly unexpected was the running torques for previously tightened bolts. After the test block was heated and cooled twice, and the tightened bolts were initially broken loose, Alseal 5000 provided a minimum torque resistance of between 60 and 370 in-lb (about 6.8 and 41.8 Nm) for the duration of the first full turn (TABLE 5). Even after the test block was heated and cooled two additional times, Alseal 5000 provided a minimum torque resistance of between 90 and 230 in-lb (about 10.2 and 26.0 Nm) for the third full turn (TABLE 6). Although Alseal 5000 was only designed to be a high temperature paint, it can also be an effective high temperature bolt locking compound when used in this manner.

Locking compound 64 can provide substantial torque resistance at high temperatures. While ordinary locking compounds withstand temperatures only up to 450 degrees Fahrenheit or lower, locking compound 64 can maintain its locking function above 500 degrees Fahrenheit, above 900 degrees Fahrenheit, or even higher. Locking compound 64 can also continue to provide running torque resistance even after a fastener has begun turning. In addition to providing strong resistance to torque, locking compound 64 can be alkaline to inhibit corrosion and thus facilitate removal of threaded fasteners. Corrosion resistance of locking compound 64 can be especially useful for bolts in automotive exhaust systems, such as header fasteners, and other high temperature systems using metals prone to corrosion. Moreover, locking compound 64 can be non-chromated, and therefore relatively environmentally friendly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, the method described with respect to FIG. 3 may be modified to use different torques, temperatures, and cure times that are suitable for a particular application.

The invention claimed is:

1. A method for securing a threaded fastener in a threaded hole, the method comprising:
   directly applying a locking compound to a portion of threads to be mated on either the threaded fastener or the threaded hole, wherein the locking compound comprises a substantially pure, non-chromated aluminum pigmented compound suspended in a water-based inorganic binder with temperature resistance in excess of 900 degrees Fahrenheit (about 482 degrees Celsius), and wherein the locking compound is between at least 5% of the portion of the fastener threads that are to be mated with the corresponding portion of the hole threads; and
   threading the threaded fastener into the threaded hole after applying the locking compound on the threads such that presence of the locking compound between the mated fastener threads and the hole threads causes an increase in running torque by at least about 60 inch-pounds after the assembly has been heated to a temperature exceeding about 900 degrees Fahrenheit (about 482 degrees Celsius).

2. The method of claim 1, and further comprising:
   cleaning the threaded fastener and the threaded hole prior to applying the locking compound to the threads.

3. The method of claim 1, and further comprising:
   drying and curing the locking compound after threading.

4. The method of claim 1, and further comprising:
   threading the threaded fastener out of the threaded hole after heating.

5. The method of claim 1, and further comprising:
   tightening the threaded fastener into the threaded hole after threading.

6. The method of claim 1, wherein the locking compound is applied on the threads of the threaded hole prior to threading the threaded fastener into the threaded hole.

7. The method of claim 1, wherein the threaded fastener is a bolt.

8. The method of claim 1, and further comprising:
   positioning a mechanical lock adjacent to the threaded fastener to resist rotation of the threaded fastener.

9. The method of claim 1, wherein the threaded hole is positioned adjacent a turbine section of a gas turbine engine.

10. The method of claim 1, wherein the locking compound comprises a paint.

11. The method of claim 1, wherein the water-based inorganic binder is alkaline.

12. The method of claim 1, wherein the locking compound is between at least 40% of the portion of the fastener threads that is mated with the corresponding portion of the hole threads.

13. The method of claim 1, wherein the locking compound is between about 100% of the portion of the fastener threads that is mated with the corresponding portion of the hole threads.

\* \* \* \* \*